United States Patent
Zhou et al.

(10) Patent No.: US 11,587,332 B2
(45) Date of Patent: Feb. 21, 2023

(54) METHOD, APPARATUS, SYSTEM, AND STORAGE MEDIUM FOR CALIBRATING EXTERIOR PARAMETER OF ON-BOARD CAMERA

(71) Applicant: Beijing Baidu Netcom Science Technology Co., Ltd., Beijing (CN)

(72) Inventors: Xun Zhou, Beijing (CN); Yuanfan Xie, Beijing (CN); Shirui Li, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 183 days.

(21) Appl. No.: 17/137,457

(22) Filed: Dec. 30, 2020

(65) Prior Publication Data

US 2021/0326605 A1 Oct. 21, 2021

(30) Foreign Application Priority Data

Apr. 20, 2020 (CN) .......................... 202010309665.6

(51) Int. Cl.
*G06T 7/80* (2017.01)
*G06V 20/56* (2022.01)
(Continued)

(52) U.S. Cl.
CPC ............ *G06V 20/588* (2022.01); *G06T 7/246* (2017.01); *G06T 7/80* (2017.01); *G06V 10/457* (2022.01); *G06T 2207/30256* (2013.01)

(58) Field of Classification Search
CPC .. G06T 7/80; G06T 7/246; G06T 2207/30256
See application file for complete search history.

(56) References Cited

U.S. PATENT DOCUMENTS

| 2011/0228101 A1* | 9/2011 | Miksch | H04N 17/002 348/175 |
| 2015/0036885 A1* | 2/2015 | Pflug | H04N 17/002 382/104 |

FOREIGN PATENT DOCUMENTS

| CN | 102435172 A | 5/2012 |
| CN | 110148177 A | 8/2019 |

(Continued)

OTHER PUBLICATIONS

Shohei Haraoka Pitch Angle Presumption from In-vehicle Monocular Camera Image for Outside Binary Name and Near-Miss Database Analysis; 25th Time Symposium on Sensing Via Image Information, Image Sensing-Technology Strudy Group, 2019. (8 pages).

(Continued)

*Primary Examiner* — Myron Wyche
(74) *Attorney, Agent, or Firm* — Harness, Dickey & Pierce, P.L.C.

(57) ABSTRACT

The present application discloses a method, an apparatus, a system, and a storage medium for calibrating an exterior parameter of an on-board camera, relating to the field of autonomous driving technologies. A specific implementation scheme of the method in the application is: preprocessing two frames of images of a former frame and a latter frame collected by the on-board camera; performing feature point matching on the two preprocessed frames of images to obtain matched feature points; determining a moving posture of the on-board camera according to the matched feature points; determining a conversion relationship between a vehicle coordinate system and an on-board camera coordinate system according to the moving posture, and obtaining the external parameter of the on-board camera relative to a vehicle body.

12 Claims, 6 Drawing Sheets

(51) Int. Cl.
*G06T 7/246* (2017.01)
*G06V 10/44* (2022.01)

(56) References Cited

FOREIGN PATENT DOCUMENTS

| | | | | |
|---|---|---|---|---|
| CN | 111780763 | * | 10/2020 | ............ G01C 21/20 |
| EP | 2618305 | A1 | 7/2013 | |
| JP | 2011217233 | A | 10/2011 | |
| JP | 2012138876 | A | 7/2012 | |
| JP | 2014101075 | A | 6/2014 | |

OTHER PUBLICATIONS

JP Office Action dated May 9, 2022 for corresponding Japanese Application No. 2021-067168. (12 pages).
Nistér D.: "An Efficient Solution to the Five-Point Relative Pose Problem", IEEE Transactions on Pattern Analysis and Machine Intelligence, IEEE Computer Society, USA, vol. 26, No. 6, Jun. 1, 2004 (Jun. 1, 2004), pp. 756-777, XP011111527.
Nistér D., et al.: "Visual odometry", Proceedings of the 2004 IEEE Computer Society Conference on Computer Vision and Pattern Recognition Jun. 27-Jul. 2, 2004, Washington, DC, USA, IEEE, Proceedings of the 2004 IEEE Computer Society Conference on Computer Vision and Pattern Recognition, vol. 1, Jun. 27, 2004 (Jun. 27, 2004), pp. 652-659, XP010708622.
Extended European Search Report for European patent application No. 21164355.6 dated Sep. 14, 2021, nine pages.
Korean Office Action dated Jul. 8, 2022 for corresponding KR Application Serial No. 10-2021-0038684 with translation. (12 pages).

* cited by examiner

METHOD, APPARATUS, SYSTEM, AND STORAGE MEDIUM FOR CALIBRATING EXTERIOR PARAMETER OF ON-BOARD CAMERA

CROSS-REFERENCE TO RELATED APPLICATION

This application claims priority to Chinese Patent Application No. 202010309665.6, filed on Apr. 20, 2020, which is hereby incorporated by reference in its entirety.

TECHNICAL FIELD

The present application relates to autonomous driving technologies in the field of data processing technologies and, in particular, relates to a method, an apparatus, a system, and a storage medium for calibrating an exterior parameter of an on-board camera.

BACKGROUND

In areas such as mobile robotics, automotive electronics, autonomous driving, etc., it is often necessary to calibrate a posture of an on-board camera in a vehicle body coordinate system.

There are three existing methods to calibrate an external parameter of a camera. A first method is to extract and match feature points of a calibration object in a customized calibration space or feature points of a known position in a specific calibration scene, so as to calibrate the external parameter of the camera. A second method is to perform iterations using characteristics of lane lines to obtain the external parameter, or to calculate an intersection of lane lines to obtain a vanishing point, and then obtain the external parameter of the camera. A third method is to determine a vanishing point of an image by obtaining an intersection point through using a connection line of matched feature points of a former frame and a latter frame in a natural scene, and perform calibration based on the vanishing point to obtain the external parameter of the camera.

However, the first method requires additional usage of a specific calibration object, or needs to perform calibration in a specific calibration scene, which limits a use condition of calibration. The second method relies on straightness and clarity of lane lines, and relies on accuracy and stability of lane line detection, and can only calibrate a pitch angle. The third method requires a vehicle to keep strictly straight during driving, no turning is allowed between the former and the latter frames, and turning data cannot be eliminated to improve algorithm stability, and it can only calibrate a pitch angle and yaw of a camera, but not a roll angle.

SUMMARY

The present application provides a method, an apparatus, a system and a storage medium for calibrating an external parameter of an on-board camera, which can automatically calibrate the external parameter of the on-board camera based on images of natural scenes collected by the on-board camera, and calibrating speed is faster and additional calibration object is not required, thereby improving efficiency and universality of external parameter calibration of the on-board camera.

In a first aspect, an embodiment of the present application provides a method for calibrating an external parameter of an on-board camera, and the method includes:

preprocessing two frames of images of a former frame and a latter frame collected by the on-board camera;

performing feature point matching on the two preprocessed frames of images to obtain matched feature points;

determining a moving posture of the on-board camera according to the matched feature points;

determining a conversion relationship between a vehicle coordinate system and an on-board camera coordinate system according to the moving posture, and obtaining the external parameter of the on-board camera relative to a vehicle body.

In the embodiment, by preprocessing the two frames of images of a former frame and a latter frame collected by the on-board camera; performing the feature point matching on the two preprocessed frames of images to obtain the matched feature points; determining the moving posture of the on-board camera according to the matched feature points; determining the conversion relationship between the vehicle coordinate system and the on-board camera coordinate system according to the moving posture, and obtaining the external parameter of the on-board camera relative to a vehicle body, the external parameter of the on-board camera can thus be automatically calibrated according to images of natural scenes collected by the on-board camera, and calibrating speed is faster and additional calibration object is not required, thereby improving efficiency and universality of external parameter calibration for the on-board camera.

In a second aspect, an embodiment of the present application provides an apparatus for calibrating an external parameter of an on-board camera, and the apparatus includes:

a collecting module, configured to preprocess two frames of images of a former frame and a latter frame collected by the on-board camera;

a matching module, configured to perform feature point matching on the two preprocessed frames of images to obtain matched feature points;

a determining module, configured to determine a moving posture of the on-board camera according to the matched feature points;

a processing module, configured to determine a conversion relationship between a vehicle coordinate system and an on-board camera coordinate system according to the moving posture, and obtain the external parameter of the on-board camera relative to a vehicle body.

In the embodiment, by preprocessing the two frames of images of a former frame and a latter frame collected by the on-board camera; performing the feature point matching on the two preprocessed frames of images to obtain the matched feature points; determining the moving posture of the on-board camera according to the matched feature points; determining the conversion relationship between the vehicle coordinate system and the on-board camera coordinate system according to the moving posture and obtaining the external parameter of the on-board camera relative to a vehicle body, the external parameter of the on-board camera can thus be automatically calibrated according to images of natural scenes collected by the on-board camera, and calibrating speed is faster and additional calibration object is not required, thereby improving efficiency and universality of external parameter calibration of the on-board camera.

In a third aspect, the application provides a system for calibrating an external parameter of an on-board camera, including: a processor and a memory; the memory stores executable instructions of the processor; where the processor is configured to execute the method for calibrating an external parameter of an on-board camera according to the first aspect via executing the executable instructions.

In a fourth aspect, the present application provides a computer readable storage medium with a computer program stored thereon, and when the program is executed by a processor, the method for calibrating an external parameter of an on-board camera according to the first aspect is implemented.

In a fifth aspect, an embodiment of the present application provides a program product, and the program product includes: a computer program which is stored in a readable storage medium, and at least one processor of a computer may read the computer program from the readable storage medium, and the at least one processor executes the computer program to cause the computer to execute the method for calibrating an external parameter of an on-board camera according to the first aspect.

In a sixth aspect, an embodiment of the present application provides a method for calibrating an external parameter of an on-board camera, and the method includes:

performing feature point matching on two frames of images of a former frame and a latter frame collected by the on-board camera to obtain matched feature points;

determining a moving posture of the on-board camera according to the matched feature points;

determining a conversion relationship between a vehicle coordinate system and an on-board camera coordinate system according to the moving posture, and obtaining the external parameter of the on-board camera relative to a vehicle body.

In the embodiment, by performing the feature point matching on the two frames of images of a former frame and a latter frame collected by the on-board camera to obtain the matched feature points; determining the moving posture of the on-board camera according to the matched feature points; determining the conversion relationship between the vehicle coordinate system and the on-board camera coordinate system according to the moving posture, and obtaining the external parameter of the on-board camera relative to a vehicle body, the external parameter of the on-board camera can thus be automatically calibrated according to images of natural scenes collected by the on-board camera, and calibrating speed is faster and additional calibration object is not required, thereby improving efficiency and universality of external parameter calibration of the on-board camera.

An embodiment in the above-mentioned application has the following advantages or beneficial effects. An external parameter of an on-board camera can be automatically calibrated according to images of natural scenes collected by the on-board camera, and calibrating speed is faster and additional calibration object is not required, thereby improving efficiency and commonality of calibrating external parameter of the on-board camera. Because of adopting the technical means of preprocessing the two frames of images of a former frame and a latter frame collected by the on-board camera; performing feature point matching on the two preprocessed frames of images to obtain the matched feature points; determining the moving posture of the on-board camera according to the matched feature points; determining the conversion relationship between the vehicle coordinate system and the on-board camera coordinate system according to the moving posture, and obtaining the external parameter of the on-board camera relative to a vehicle body, technical problems that existing external parameter calibration of an on-board camera relies on a feature scene and a calibration object, universality is poor, and calibrating efficiency is poor are overcome. By calibrating the external parameter of the on-board camera automatically through images of natural scenes collected by the on-board camera, the calibrating speed is faster, and the additional calibration object is not required, thereby improving the efficiency and universality of external parameter calibration of the on-board camera.

Other effects of the above-mentioned optional manners will be described below in combination with specific embodiments.

BRIEF DESCRIPTION OF THE DRAWINGS

Drawings are used for better understanding of the solutions and do not constitute a limitation to the application, where.

DETAILED DESCRIPTION OF THE EMBODIMENTS

Figure 1:
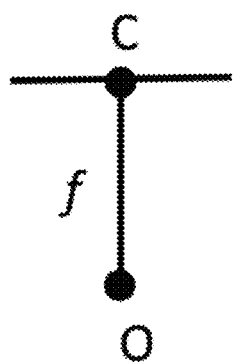
FIG. 1 is a schematic diagram of a camera imaging model.

The following describes exemplary embodiments of the present application in combination with accompanying drawings, which include various details of the embodiments of the present application to facilitate understanding, and should be considered as merely exemplary. Therefore, those of ordinary skill in the art should recognize that various changes and modifications may be made to the embodiments described herein without departing from scope and spirit of the present application. Likewise, for clarity and conciseness, descriptions of well-known functions and structures are omitted in the following description.

The terms "first", "second", "third", "fourth", etc. (if any) in specification and claims of the present application and the above-mentioned drawings are used to distinguish similar objects, and do not have to be used to describe a specific order or sequence. It should be understood that data used in this way may be interchanged under an appropriate circumstance, so that the embodiments of the present application described herein, for example, may be implemented in a sequence other than those illustrated or described herein. In addition, the terms "including" and "having" and any variations of them are intended to cover non-exclusive inclusions, for example, a process, a method, a system, a product, or a device including a series of steps or units is not necessarily limited to those steps or units clearly listed, but may include other steps or units which are not clearly listed or are inherent to the process, method, product, or device.

Technical solutions of the present application will be described in detail below with specific embodiments. The following specific embodiments may be combined with each other, and same or similar concepts or processes may not be repeated in some embodiments.

In areas such as mobile robotics, automotive electronics, autonomous driving, etc., it is often necessary to calibrate a posture of an on-board camera in a vehicle body coordinate system. There are three existing methods to calibrate an external parameter of a camera. A first method is to extract and match feature points of a calibration object in a customized calibration space or feature points of a known position in a specific calibration scene, so as to calibrate the external parameter of the camera. A second method is to perform iterations using characteristics of lane lines to obtain the external parameter, or to calculate an intersection of the lane lines to obtain a vanishing point, and then obtain the external parameter of the camera. A third method is to determine a vanishing point of an image by obtaining an intersection point using a connection line of matched feature points of a former frame and a latter frame in a natural scene, and perform calibration based on the vanishing point to obtain the external parameter of the camera. However, the first method requires additional usage of a specific calibration object, or needs to perform calibration in a specific calibration scene, which limits a use condition of calibration. The second method relies on straightness and clarity of the lane lines, and relies on accuracy and stability of lane line detection, and can only calibrate a pitch angle. The third method requires a vehicle to keep strictly straight during driving, no turning is allowed between the former and the latter frames, and turning data cannot be eliminated to improve algorithm stability, and it can only calibrate a pitch angle and yaw of a camera, but not a roll angle.

Aiming at the above-mentioned technical problems, the application provides a method, an apparatus, a system, and a storage medium for calibrating an external parameter of an on-board camera, which can automatically calibrate the external parameter of the on-board camera according to images of natural scenes collected by the on-board camera, and calibrating speed is faster and additional calibration object is not required, thereby improving efficiency and universality of external parameter calibration of the on-board camera.

Figure 2:
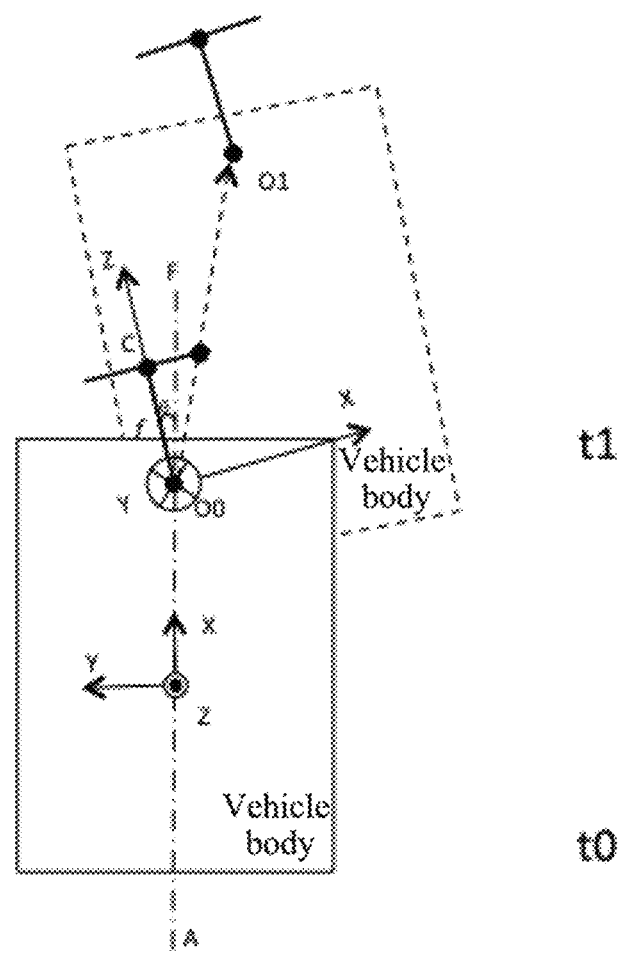
FIG. 2 is a schematic principle diagram of implementing a method for calibrating an external parameter of an on-board camera according to an embodiment of the present application.

FIG. 1 is a schematic diagram of a camera imaging model. As shown in FIG. 1, O is a focus of a camera, C is a principal point of an imaging plane, and OC is focal length f. FIG. 2 is a schematic principle diagram of implementing a method for calibrating an external parameter of an on-board camera according to an embodiment of the present application. As shown in FIG. 2, for a vehicle coordinate system, an x direction is defined as a forward direction, a y direction is defined as a leftward direction, and a z direction is defined as a downward direction. For a camera coordinate system, an x direction is defined as a rightward direction, a y direction is defined as a vertically downward direction, and a z direction is defined as a forward direction (relative to the camera itself). As shown in FIG. 2, when a vehicle is moving, the vehicle moves from a position at t0 to another position at t1. A camera is installed in front of a front of the vehicle (it may also be installed at any position of the vehicle), and its angle with a center axis of the vehicle is 0. The vehicle moves from time t0 to time t1, where 0001 is a direction in which the camera moves when the vehicle is moving, and AF is the center axis of the vehicle.

1) Feature points of a former frame and a latter frame are matched. An essential matrix between the cameras at t0 and t1 may be obtained by using epipolar geometry. A rotation matrix and a translation unit vector of the camera may be obtained by SVD decomposition, and whether the vehicle goes straight or turn may be judged according to a rotation angle of the camera.

2) When the vehicle goes straight, a connection line of the positions of the vehicle at time t0 and t1, which is a vector 0001, coincides with the center axis of the vehicle (vibration and deflection may occur in the process), that is, the vector 0001 is in the X-axis direction of the vehicle coordinate system. And a translation vector obtained by the decomposition in step 1 is a unit vector of the vector 0001, then an expression of a unit vector of the vehicle's X-axis in the camera coordinate system is obtained.

3) When the vehicle turns, it may be understood that the vehicle is rotating around a rotation axis z' perpendicular to the ground, and z' is parallel to the Z-axis of the vehicle coordinate system. The rotation matrix obtained from the decomposition in step 1 is converted into an expression of a rotation angle and a rotation axis, and, it may be known from definition that the rotation axis is the rotation axis z' around which the rotation is made.

4) From the determined X-axis and Z-axis, the Y-axis may be obtained using a vector cross product, and so far, descriptions of three coordinate axis vectors of the vehicle coordinate system based on the camera coordinate system are obtained, so the external parameter of the camera in the vehicle coordinate system can be obtained Application of the above-mentioned method overcomes the technical problems that existing external parameter calibration of an on-board camera relies on a feature scene and a calibration object, universality is poor, and calibrating efficiency is low. By calibrating the external parameter of the on-board camera automatically through images of natural scenes collected by the on-board camera, calibrating speed is faster, and additional calibration object is not required, thereby improving the efficiency and universality of external parameter calibration of the on-board camera.

Figure 3:
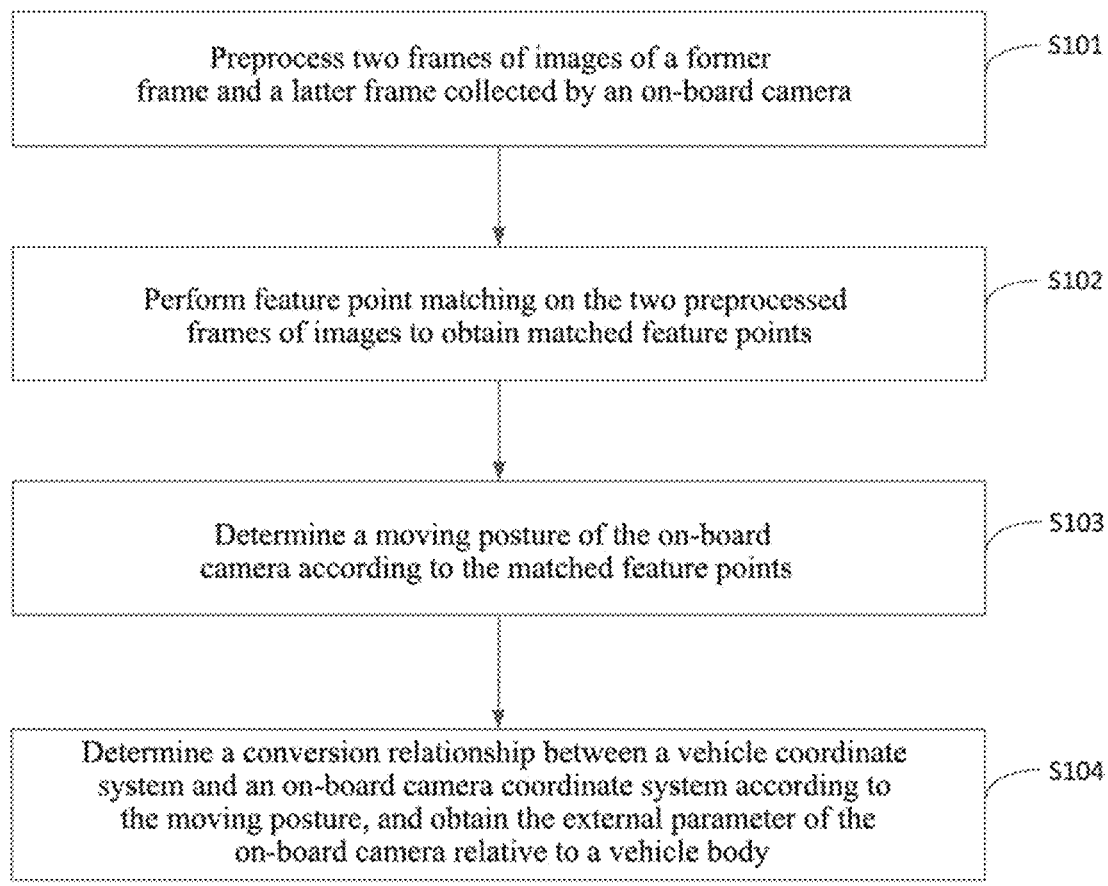
FIG. 3 is a schematic diagram according to a first embodiment of the present application.

FIG. 3 is a schematic diagram according to a first embodiment of the present application, and as shown in FIG. 3, a method for calibrating an external parameter of an on-board camera in the embodiment may include:

S101: Preprocess two frames of images of a former frame and a latter frame collected by an on-board camera.

S102: Perform feature point matching on the two preprocessed frames of images to obtain matched feature points.

S103: Determine a moving posture of the on-board camera according to the matched feature points.

S104: Determine a conversion relationship between a vehicle coordinate system and an on-board coordinate system based on the moving posture, and obtain an external parameter of the on-board camera relative to the vehicle body.

In the embodiment, by preprocessing the two frames of images of a former frame and a latter frame collected by the on-board camera; performing the feature point matching on the two preprocessed frames of images to obtain the matched feature points; determining the moving posture of the on-board camera according to the matched feature points; determining the conversion relationship between the vehicle coordinate system and the on-board camera coordinate system according to the moving posture and obtaining the external parameter of the on-board camera relative to a vehicle body, the external parameter of the on-board camera can thus be automatically calibrated according to images of natural scenes collected by the on-board camera, and calibrating speed is faster and additional calibration object is not required, thereby improving efficiency and universality of external parameter calibration of the on-board camera.

Illustratively, in step S101, the two frames of images of a former frame and a latter frame collected by the on-board camera may be subjected to de-distortion processing and enhancement processing to obtain the two preprocessed frames of images.

In the embodiment, by performing preprocessing, such as de-distortion processing and enhancement processing, on the two frames of images of a former frame and a latter frame collected by the on-board camera, quality of images is thus improved, thereby facilitating subsequent detection and matching of feature points in the images.

Specifically, images I0 and I1 may be collected by the camera at time t0 and t1, respectively. During the driving of a motor vehicle, due to various reasons, such as an uneven road surface or an excessive speed bump, a vehicle body or an on-board camera may shake or deflect. This may cause distortion, blurring, etc. in the two frames of images of the former frame and the latter frame, I0 and I1, collected by the on-board camera. Therefore, the images may be preprocessed, including de-distortion processing and enhancement processing, to obtain two preprocessed frames of images, thereby improving the quality of the images, so as to facilitate the subsequent detection and matching of feature points in the images.

Illustratively, in step S102, feature points may be extracted from the two preprocessed frames of images, respectively; pairwise matching and detection is performed on the feature points to obtain N sets of matched feature points, where N is a natural number greater than 5.

In the embodiment, it is assumed that the image I0 and the image I1 are collected by the camera at time t0 and t1, respectively. By using an image feature point detection algorithm and a feature point matching algorithm, N (N>=5) sets of matched feature points are detected from the image I0 and the image I1, so that a moving posture of the on-board camera can be determined based on the N sets of matched feature points in subsequent steps.

Figure 4:
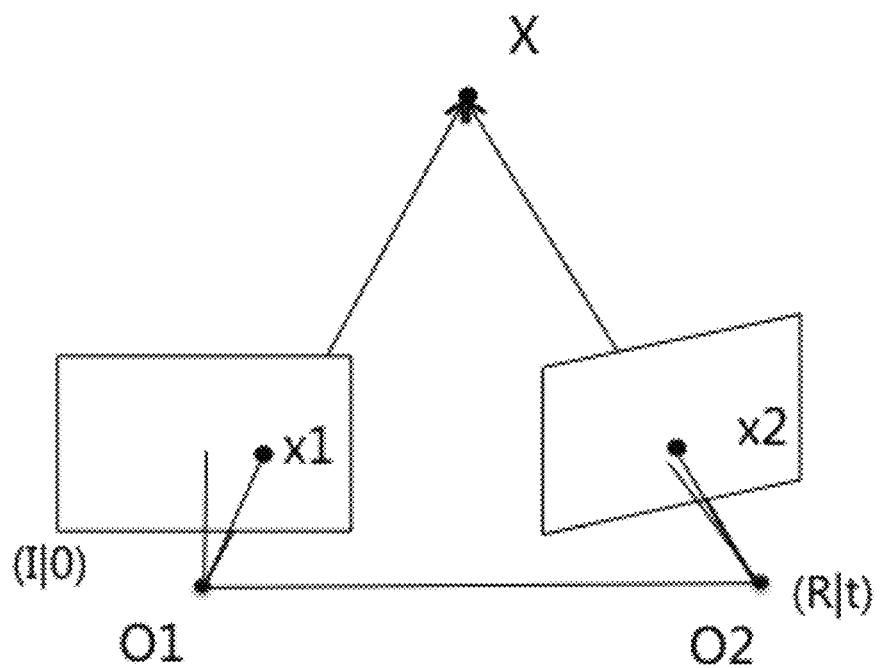
FIG. 4 is a schematic principle diagram of feature point matching according to the present application.

Specifically, FIG. 4 is a schematic principle diagram of feature point matching according to the present application. As shown in FIG. 4, the images of a point X in a world coordinate system are x1 and x2 in two cameras (or at different moments of a single camera), respectively. Therefore, x1 and x2 may be detected as a set of matched feature points in the images I0 and I1 by using the image feature point detection algorithm and the feature point matching algorithm. Similarly, multiple sets of matched feature points may be detected in the images I0 and I1. In calculation process of the embodiment, at least 5 sets of matched feature points are required.

Illustratively, in step S103, the essential matrix may be solved by the matched feature points according to a principle of epipolar geometry. The essential matrix is decomposed to obtain a rotation matrix and a translation vector. According to the rotation matrix and the translation vector, the moving posture of the on-board camera is determined, where the moving posture includes: a rotation posture, a translation posture.

In the embodiment, the essence matrix is solved by the matched feature points through the principle of epipolar geometry; the rotation matrix and the translation vector are obtained by decomposing the essence matrix; the moving posture of the on-board camera is determined according to the rotation matrix and the translation vector, so that a state of the vehicle during driving can be divided into two conditions: going straight and turning, so as to calculate coordinate axis directions of the vehicle coordinate system for the state of the vehicle in different postures subsequently.

Specifically, taking a set of matched feature points x1 and x2 in FIG. 4 as an example, according to the principle of epipolar geometry, it can be known that x1 and x2 satisfy $x_2^T F x_1 = 0$, where F is a basic matrix, and $F = K_2^{-T} B K_1^{-1}$, where B is an essential matrix, and K is a camera internal parameter. Since the two images are images of the same camera at different times, K1=K2=K, so $x_2 K^{-T} B K^{-1} x_1 = 0$. By detecting N>=5 pairs of feature points in S102, a solution matrix may be constructed to solve B, where there are many methods that may be used, such as a five-point method, a six-point method and so on. And the solution method will not be detailed here. The essential matrix B contains rotation and translation information, and B=t×R, where t is a translation vector and R is a rotation matrix. Therefore, after solving B, the rotation matrix R and the translation vector t may be obtained through matrix decomposition, and coordinate axis vectors may be calculated. The rotation matrix R and the translation vector may also be used to determine whether the moving posture of the on-board camera is a rotation posture or a translation posture.

Illustratively, in step S104, it may be determined whether the vehicle satisfies a condition of going straight or a condition of turning, according to the moving posture; if the condition of going straight is satisfied, an X-axis direction of the vehicle coordinate system is determined through pole coordinates of the on-board camera; if the condition of turning is satisfied, a Z-axis direction of the vehicle coordinate system is determined through the rotation matrix; a Y-axis direction of the vehicle coordinate system is determined according to the X-axis direction and the Z-axis direction of the vehicle coordinate system through a vector cross product operation; and the external parameter of the on-board camera relative to the vehicle body is determined according to the X-axis direction, the Z-axis direction and the Y-axis direction of the vehicle coordinate system and according to the on-board camera coordinate system.

In the embodiment, the X-axis, Z-axis, and Y-axis directions of the vehicle coordinate system can be accurately obtained without being affected by the moving posture of the vehicle, so that the external parameter of the camera can be obtained by conversion according to the known vehicle coordinate system, and thus calibrating speed is faster, and additional calibration object is not required, thereby improving efficiency and universality of external parameter calibration of the vehicle-mounted camera.

Specifically, the moving posture of the camera movement may be used to determine whether the vehicle satisfies the condition of going straight or the condition of turning; while going straight, pole coordinates are used to obtain the X-axis direction of the vehicle coordinate system; while turning, the rotation matrix is converted into an expression of angle and axis, with the rotation axis being the Z-axis direction. Then, statistical values of X-axis and Z-axis coordinates are calculated by multiple iterations according to a statistical method. Finally, the X-axis and Z-axis are used to solve the Y-axis, and then, descriptions of three coordinate axis vectors of the vehicle coordinate system based on the camera coordinate system are obtained, and thus the external parameter of the camera in the vehicle coordinate system can be obtained.

In a possible situation, if the condition of going straight is satisfied, pole coordinates of the on-board camera are used to determine the X-axis direction of the vehicle coordinate system, which includes: obtaining a connecting-line vector of the pole coordinates of the on-board camera in the two preprocessed frames of images; if the connecting-line vector coincides with a center axis direction of the vehicle body, determining that the condition of going straight is satisfied, and taking a unit vector corresponding to the connecting-line vector as the X-axis direction of the vehicle coordinate system.

In the embodiment, when it is determined that the vehicle is in a state of going straight, the X-axis direction of the vehicle coordinate system may be determined by the pole coordinates of the on-board camera, that is, the unit vector corresponding to the connecting-line vector is taken as the X-axis direction of the vehicle coordinate system, so that the X-axis direction of the vehicle coordinate can be quickly determined.

In another possible situation, if the condition of turning is satisfied, the Z-axis direction of the vehicle coordinate system is determined by the rotation matrix, which includes: obtaining a connecting-line vector of the pole coordinates of the on-board camera in the two preprocessed frames of images; if the connecting-line vector does not coincide with the center axis direction of the vehicle body, determining that the condition of turning is satisfied; taking the rotation axis direction obtained by conversion of the rotation matrix as the Z-axis direction of the vehicle coordinate system.

In the embodiment, when it is determined that the vehicle is in a state of turning, the rotation axis direction obtained by the conversion of the rotation matrix may be taken as the Z-axis direction of the vehicle coordinate system. Therefore, calibration of the on-board camera may not be affected by a change in the posture of the vehicle during driving, and universality of external parameter calibration is improved.

Specifically, when a connecting line of positions of a vehicle at time t0 and t1, which is a vector 0001, coincides with the center axis direction of the vehicle body (vibration and deflection may occur in the process), that is, the vector 0001 is the X-axis direction of the vehicle coordinate system, then the vehicle may be determined to go straight, otherwise the vehicle is turning. If the condition of going straight is satisfied, a translation vector obtained by decomposing a connecting-line vector is a unit vector of the vector 0001, that is, an expression of a unit vector of the vehicle's X-axis in the camera coordinate system is obtained. If the condition of turning is satisfied, it may be understood that the vehicle rotates around a rotation axis z' perpendicular to the ground, and z' is parallel to the Z-axis of the vehicle coordinate system, and the rotation matrix obtained from the previous decomposition is converted into an expression of a rotating angle and a rotation axis, and it can be known from definition that the rotation axis is the rotation axis z' around which the rotation is.

In the embodiment, by preprocessing the two frames of images of a former frame and a latter frame collected by the on-board camera; performing the feature point matching on the two preprocessed frames of images to obtain the matched feature points; determining the moving posture of the on-board camera according to the matched feature points; determining the conversion relationship between the vehicle coordinate system and the on-board camera coordinate system according to the moving posture, and determining the external parameter of the on-board camera relative to a vehicle body, the technical problems that existing external parameter calibration of an on-board camera relies on a feature scene and a calibration object, universality is poor, and calibrating efficiency is low, are thus overcome. By calibrating the external parameter of the on-board camera automatically through images of natural scenes collected by the on-board camera, calibrating speed is faster, and additional calibration object is not required, thereby improving efficiency and universality of external parameter calibration of the on-board camera.

Figure 5:
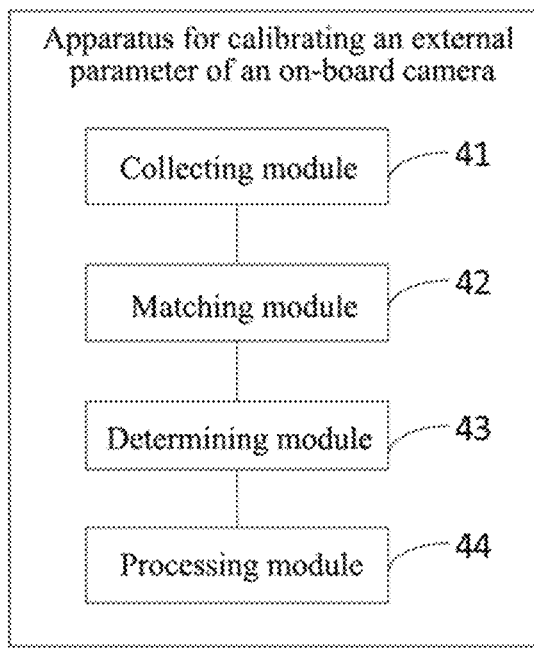
FIG. 5 is a schematic diagram according to a second embodiment of the present application.

FIG. 5 is a schematic diagram of a second embodiment according to the present application; as shown in FIG. 5, an apparatus in the embodiment may include:

a collecting module 41, configured to preprocess two frames of images of a former frame and a latter frame collected by the on-board camera;

a matching module 42, configured to perform feature point matching on the two preprocessed frames of images to obtain matched feature points;

a determining module 43, configured to determine a moving posture of the on-board camera according to the matched feature points; and a processing module 44, configured to determine a conversion relationship between a vehicle coordinate system and an on-board camera coordinate system according to the moving posture, and obtain the external parameter of the on-board camera relative to a vehicle body.

In the embodiment, by preprocessing the two frames of images of a former frame and a latter frame collected by the on-board camera; performing the feature point matching on the two preprocessed frames of images to obtain the matched feature points; determining the moving posture of the on-board camera according to the matched feature points; determining the conversion relationship between the vehicle coordinate system and the on-board camera coordinate system according to the moving posture and obtaining the external parameter of the on-board camera relative to a vehicle body, the external parameter of the on-board camera can thus be automatically calibrated according to images of natural scenes collected by the on-board camera, and calibrating speed is faster and additional calibration object is not required, thereby improving efficiency and universality of external parameter calibration of the on-board camera.

In a possible design, the collecting module 41 is specifically configured to: perform de-distortion processing and enhancement processing on the two frames of images of the former frame and the latter frame collected by the on-board camera to obtain the two preprocessed frames of images.

In the embodiment, by performing preprocessing, such as de-distortion processing and enhancement processing, on the two frame of images of the former frame and the latter frame collected by the on-board camera, quality of images is thus improved, thereby facilitating subsequent detection and matching of feature points in the images.

In a possible design, the matching module 42 is specifically configured to: extract feature points from the two preprocessed frames of images, respectively;

perform pairwise matching and detection on the feature points to obtain N sets of matched feature points, where, N is a natural number greater than 5.

In the embodiment, it is assumed that the image I0 and the image I1 may be collected by the camera at time t0 and t1, respectively. By using an image feature point detection algorithm and a feature point matching algorithm, N (N>=5) sets of matched feature points are detected from the image I0 and the image I1, so that a moving posture of the on-board camera can be determined based on the N sets of matched feature points in subsequent steps.

In a possible design, the determining module 43 is specifically configured to:

solve an essential matrix by the matched feature points according to a principle of epipolar geometry;

decompose the essential matrix to obtain a rotation matrix and a translation vector;

determine the moving posture of the on-board camera according to the rotation matrix and the translation vector, where the moving posture includes: a rotation posture, a translation posture.

In the embodiment, the essence matrix is solved by the matched feature points through the principle of epipolar geometry; the rotation matrix and the translation vector are obtained by decomposing the essence matrix; the moving posture of the on-board camera is determined according to the rotation matrix and the translation vector, so that a state of the vehicle during driving can be divided into two conditions: going straight and turning, so as to calculate coordinate axis directions of the vehicle coordinate system for the state of the vehicle in different postures subsequently.

In a possible design, the processing module 44 is specifically configured to:

determine whether the vehicle satisfies a condition of going straight or a condition of turning, according to the moving posture;

if the condition of going straight is satisfied, determine an X-axis direction of the vehicle coordinate system through pole coordinates of the on-board camera;

if the condition of turning is satisfied, determine a Z-axis direction of the vehicle coordinate system through the rotation matrix;

determine a Y-axis direction of the vehicle coordinate system according to the X-axis direction and the Z-axis direction of the vehicle coordinate system through a vector cross product operation;

determine the external parameter of the on-board camera relative to the vehicle body according to the X-axis direction, the Z-axis direction and the Y-axis direction of the vehicle coordinate system and according to the on-board camera coordinate system.

In the embodiment, the X-axis, Z-axis, and Y-axis directions of the vehicle coordinate system can be accurately obtained without being affected by the moving posture of the vehicle, so that the external parameter of the camera can be obtained by conversion according to the known vehicle coordinate system, and thus calibrating speed is faster, and additional calibration object is not required, thereby improving efficiency and universality of external parameter calibration of the vehicle-mounted camera.

In a possible design, the processing module 44 is specifically configured to:

obtain a connecting-line vector of pole coordinates of the on-board camera in the two preprocessed frames of images;

if the connecting-line vector coincides with a center axis direction of the vehicle body, determine that the condition of going straight is satisfied, and take a unit vector corresponding to the connecting-line vector as the X-axis direction of the vehicle coordinate system.

In the embodiment, when it is determined that the vehicle is in a state of going straight, the X-axis direction of the vehicle coordinate system may be determined by the pole coordinates of the on-board camera, that is, the unit vector corresponding to the connecting-line vector is taken as the X-axis direction of the vehicle coordinate system.

In a possible design, the processing module 44 is specifically configured to:

obtain a connecting-line vector of pole coordinates of the on-board camera in the two preprocessed frames of images;

if the connecting-line vector does not coincide with the center axis direction of the vehicle body, determine that the condition of turning is satisfied;

take a rotation axis direction obtained by conversion of the rotation matrix as the Z-axis direction of the vehicle coordinate system.

In the embodiment, when it is determined that the vehicle is in a state of turning, the rotation axis direction obtained by the conversion of the rotation matrix may be taken as the Z-axis direction of the vehicle coordinate system. Therefore, calibration of the on-board camera may not be affected by a change in the posture of the vehicle during driving, and universality of external parameter calibration is improved.

The apparatus for calibrating an external parameter of an on-board camera according to the embodiment can implement the technical solution in the method shown in FIG. 3, and for its specific implementation process and technical principle, please refer to related description in the method shown in FIG. 3, which will not be repeated here.

In the embodiment, by preprocessing the two frames of images of a former frame and a latter frame collected by the on-board camera; performing the feature point matching on the two preprocessed frames of images to obtain the matched feature points; determining the moving posture of the on-board camera according to the matched feature points; determining the conversion relationship between the vehicle coordinate system and the on-board camera coordinate system according to the moving posture, and determining the external parameter of the on-board camera relative to a vehicle body, the technical problems that existing external parameter calibration of an on-board camera relies on a feature scene and a calibration object, universality is poor, and calibrating efficiency is low, are thus overcome. By calibrating the external parameter of the on-board camera automatically through images of natural scenes collected by the on-board camera, calibrating speed is faster, and additional calibration object is not required, thereby improving efficiency and universality of external parameter calibration of the on-board camera.

Figure 6:
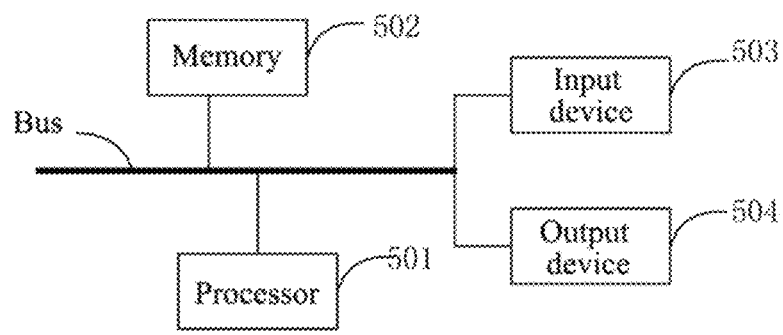
FIG. 6 is a block diagram of implementing a system for calibrating an external parameter of an on-board camera according to an embodiment of the present application.

FIG. 6 is a block diagram of implementing a system for calibrating an external parameter of an on-board camera according to an embodiment of the present application; as shown in FIG. 6, there is a block diagram of the system for calibrating an external parameter of an on-board camera according to the embodiment of the present application. The system is intended to represent various forms of digital computers, such as a laptop computer, a desktop computer, a workstation, a personal digital assistant, a server, a blade server, a mainframe computer, and other suitable computers. The system may further represent various forms of mobile devices, such as a personal digital assistant, a cellular phone, a smart phone, a wearable device, and other similar computing devices. The components shown herein, their connections and relationships, and their functions are merely examples, and are not intended to limit the implementations of the embodiments of the present application described and/or required herein.

As shown in FIG. 6, the system for calibrating an external parameter of an on-board camera includes one or more processors 501, a memory 502, and interfaces for connecting various components, including a high-speed interface and a low-speed interface. The various components are connected to each other by using different buses, and may be installed on a common motherboard or installed in other ways as required. The processor may process instructions executed in the system, including instructions stored in or on the memory to display graphical information of the GUI on an external input/output device (such as a display device coupled to an interface). In other implementations, if necessary, a plurality of processors and/or a plurality of buses may be used with a plurality of memories. Similarly, a plurality of systems may be connected, and each system provides some necessary operations (for example, as a server array, a group of blade servers, or a multi-processor system). One processor 501 is taken as an example in FIG. 6.

The memory 502 is a non-transitory computer readable storage medium provided by the present application, where the memory stores instructions executable by at least one processor, so that the at least one processor executes the method for calibrating an external parameter of an on-board camera in FIG. 6 provided by the present application. The non-transitory computer readable storage medium of the present application stores computer instructions used to enable a computer to execute the method for calibrating an external parameter of an on-board camera provided by the present application.

As a non-transitory computer readable storage medium, the memory 502 may be used to store non-transitory software programs, non-transitory computer executable programs, and modules, such as program instructions/modules corresponding to the method for calibrating an external parameter of an on-board camera in FIG. 6 provided by the present application. The processor 501 executes various functional applications and data processing of a computer by running non-transitory software programs, instructions, and modules stored in the memory 502, that is, implements the method for calibrating an external parameter of an on-board camera in FIG. 6 provided by the above method embodiments.

The memory 502 may include a program storage area and a data storage area, where the program storage area may store an operating system and an application program required by at least one function; the data storage area may store data created according to usage of the system for calibrating an external parameter of an on-board camera in FIG. 6. In addition, the memory 502 may include a high-speed random-access memory, and may further include a non-transitory memory, for example, at least one magnetic disk storage device, a flash memory device, or other non-instantaneous solid-state storage devices. In some embodiments, the memory 502 optionally includes memories remotely provided with respect to the processor 501, and these remote memories may be connected to the system for calibrating an external parameter of an on-board camera in FIG. 6 through a network. Examples of the above-mentioned network includes, but are not limited to, the Internet, a corporate intranet, a local area network, a mobile communication network, and combinations thereof.

The system for calibrating an external parameter of an on-board camera in FIG. 6 may further include: an input device 503 and an output device 504. The processor 501, the memory 502, the input device 503, and the output device 504 may be connected by a bus or in other ways, and the connection by a bus is taken as an example in FIG. 6.

The input device 503 may receive input digital or character information, and generate key signal input related to user settings and function control of the system for calibrating an external parameter of an on-board camera in FIG. 6, for example, a touch screen, a keypad, a mouse, a track pad, a touch pad, a pointing stick, one or more mouse buttons, a trackball, a joystick, and other input devices. The output device 504 may include a display device, an auxiliary lighting device (for example, an LED), a tactile feedback device (for example, a vibration motor), and the like. The display device may include, but is not limited to, a liquid crystal display (liquid crystal display, LCD), a light emitting diode (light emitting diode, LED) display, and a plasma display. In some implementations, the display device may be a touch screen.

Various implementations of the systems and techniques described herein may be implemented in a digital electronic circuit system, an integrated circuit system, a dedicated ASIC (application specific integrated circuits, ASIC), computer hardware, firmware, software, and/or combinations thereof. These various implementations may include: being implemented in one or more computer programs. The one or more computer programs may be executed and/or interpreted on a programmable system including at least one programmable processor, and the programmable processor may be a dedicated or general-purpose programmable processor, which may receive data and instructions from a storage system, at least one input device and at least one output device, and transmit data and instructions to the storage system, the at least one input device and the at least one output device.

These computing programs (also called programs, software, software applications, or codes) include machine instructions of a programmable processor, and may be implemented using high-level procedure and/or object-oriented programming languages, and/or an assembly/machine language. As used herein, the terms "machine readable medium" and "computer readable medium" refer to any computer program product, device, and/or apparatus (for example, a magnetic disk, an optical disk, a memory, a programmable logic device (programmable logic device, PLD)) used to provide machine instructions and/or data to a programmable processor, including a machine readable medium receiving machine instructions as machine readable signals. The term "machine-readable signal" refers to any signal used to provide machine instructions and/or data to a programmable processor.

In order to provide interaction with a user, the systems and techniques described here may be implemented on a computer, and the computer includes: a display device for displaying information to the user (for example, a CRT (cathode ray tube, CRT) or a LCD (liquid crystal display, LCD) monitor); and a keyboard and a pointing device (for example, a mouse or a trackball) through which the user may provide input to the computer. Other types of devices may also be used to provide interaction with the user; for example, the feedback provided to the user may be any form of sensing feedback (for example, a visual feedback, an auditory feedback, or a tactile feedback); and may receive an input from the user in any form (including an acoustic input, a voice input, or a tactile input).

The systems and technologies described herein may be implemented in a computing system including a back-end component (for example, as a data server), or a computing system including a middleware component (for example, an application server), or a computing system including a front-end component (for example, a user computer with a graphical user interface or a web browser, and the user may interact with the implementations of the systems and technologies described herein through the user computer), or a computing system including a combination of the back-end component, the middleware component and the front-end component. The components of the system may be connected to each other through any form or medium of digital data communication (for example, a communication network). Examples of communication networks include: a local area network (local area network, LAN), a wide area network (wide area network, WAN), and the Internet.

The computer system may include a client and a server. The client and the server are generally far away from each other and usually interact through a communication network. The relationship between the client and the server is generated by computer programs running on the corresponding computers and having a client-server relationship with each other.

Figure 7:
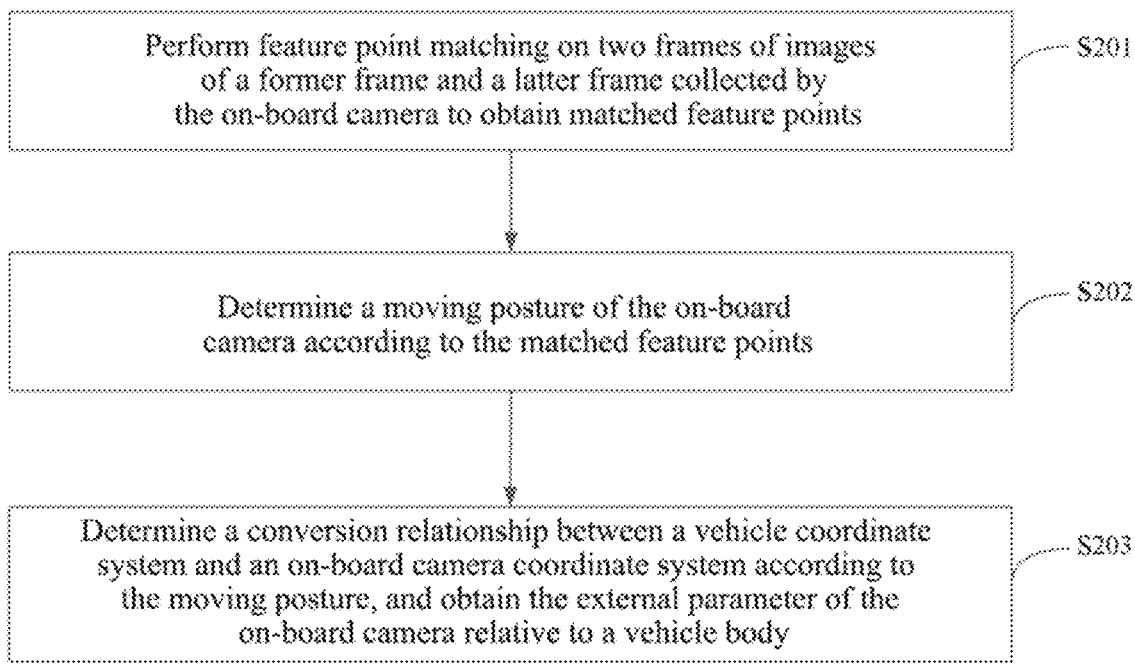
FIG. 7 is a schematic diagram according to an embodiment of the present application.

FIG. 7 is a schematic diagram according to an embodiment of the present application, and as shown in FIG. 7, a method for calibrating an external parameter of an on-board camera in the embodiment may include:

S201: Perform feature point matching on two frames of images of a former frame and a latter frame collected by the on-board camera to obtain matched feature points;

S202: Determine a moving posture of the on-board camera according to the matched feature points;

S203: Determine a conversion relationship between a vehicle coordinate system and an on-board camera coordinate system according to the moving posture, and obtain the external parameter of the on-board camera relative to a vehicle body.

It should be understood that the various forms of processes shown above may be used to reorder, add, or delete steps. For example, the steps described in the present application may be executed in parallel, sequentially, or in a different order, as long as desired results of the technical solutions of the present application may be achieved, which will not be limited herein.

The above-mentioned specific implementations do not constitute a limitation on the protection scope of the present application. Those skilled in the art should understand that various modifications, combinations, sub-combinations, and substitutions can be made according to design requirements and other factors. Any modification, equivalent substitution, and improvement made within the spirit and principles of the application should be included in the protection scope of the application.

What is claimed is:

1. A method for calibrating an external parameter of an on-board camera, comprising:
preprocessing two frames of images of a former frame and a latter frame collected by the on-board camera;
performing feature point matching on the two preprocessed frames of images to obtain matched feature points;
determining a moving posture of the on-board camera according to the matched feature points;
determining a conversion relationship between a vehicle coordinate system and an on-board camera coordinate system according to the moving posture, and obtaining the external parameter of the on-board camera relative to a vehicle body;
wherein the preprocessing two frames of images of a former frame and a latter frame collected by the on-board camera comprises:
performing de-distortion processing and enhancement processing on the two frames of images of the former frame and the latter frame collected by the on-board camera to obtain the two preprocessed frames of images;
wherein the determining a conversion relationship between a vehicle coordinate system and an on-board camera coordinate system according to the moving posture and obtaining the external parameter of the on-board camera relative to a vehicle body comprises:
determining, according to the moving posture, whether a vehicle satisfies a condition of going straight or a condition of turning;
determining an X-axis direction of the vehicle coordinate system through pole coordinates of the on-board camera in a case that the condition of going straight is satisfied;
determining a Z-axis direction of the vehicle coordinate system through a rotation matrix in a case that the condition of turning is satisfied;
determining a Y-axis direction of the vehicle coordinate system according to the X-axis direction and the Z-axis direction of the vehicle coordinate system through a vector cross product operation;
determining the external parameter of the on-board camera relative to the vehicle body according to the X-axis direction, the Z-axis direction and the Y-axis direction of the vehicle coordinate system and according to the on-board camera coordinate system;
wherein the determining an X-axis direction of the vehicle coordinate system through pole coordinates of the on-board camera in a case that the condition of going straight is satisfied, comprises:
obtaining a connecting-line vector of the pole coordinates of the on-board camera in the two preprocessed frames of images;
determining that the condition of going straight is satisfied and taking a unit vector corresponding to the connecting-line vector as the X-axis direction of the vehicle coordinate system, in a case that the connecting-line vector coincides with a center axis direction of the vehicle body;
wherein the determining a Z-axis direction of the vehicle coordinate system through a rotation matrix in a case that the condition of turning is satisfied, comprises:
obtaining a connecting-line vector of the pole coordinates of the on-board camera in the two preprocessed frames of images;
determining that the condition of turning is satisfied in a case that the connecting-line vector does not coincide with the center axis direction of the vehicle body;
taking a rotation axis direction which is obtained by conversion of the rotation matrix, as the Z-axis direction of the vehicle coordinate system.

2. The method according to claim 1, wherein the performing feature point matching on the two preprocessed frames of images to obtain matched feature points comprise:
extracting feature points from the two preprocessed frames of images, respectively;
performing pairwise matching and detection on the feature points to obtain N sets of matched feature points, wherein N is a natural number greater than 5.

3. The method according to claim 1, wherein the determining a moving posture of the on-board camera according to the matched feature points comprises:
solving an essential matrix through the matched feature points according to a principle of epipolar geometry;
obtaining a rotation matrix and a translation vector by decomposing the essential matrix;
determining the moving posture of the on-board camera according to the rotation matrix and the translation vector, wherein the moving posture includes: a rotation posture, a translation posture.

4. An apparatus for calibrating an external parameter of an on-board camera, comprising:
at least one processor; and a memory communicatively connected to the at least one processor; wherein, the memory stores instructions executable by the at least one processor, the instructions being executed by the at least one processor to enable the at least one processor to:

preprocess two frames of images of a former frame and a latter frame collected by the on-board camera;

perform feature point matching on the two preprocessed frames of images to obtain matched feature points;

determine a moving posture of the on-board camera according to the matched feature points;

determine a conversion relationship between a vehicle coordinate system and an on-board camera coordinate system according to the moving posture, and obtain the external parameter of the on-board camera relative to a vehicle body;

wherein the at least one processor is further enabled to:

perform de-distortion processing and enhancement processing on the two frames of images of the former frame and the latter frame collected by the on-board camera to obtain the two preprocessed frames of images;

wherein the at least one processor is further enabled to:

determine, according to the moving posture, whether a vehicle satisfies a condition of going straight or a condition of turning;

determine an X-axis direction of the vehicle coordinate system through pole coordinates of the on-board camera in a case that the condition of going straight is satisfied;

determine a Z-axis direction of the vehicle coordinate system through a rotation matrix in a case that the condition of turning is satisfied;

determine a Y-axis direction of the vehicle coordinate system according to the X-axis direction and the Z-axis direction of the vehicle coordinate system through a vector cross product operation;

determine the external parameter of the on-board camera relative to the vehicle body according to the X-axis direction, the Z-axis direction and the Y-axis direction of the vehicle coordinate system and according to the on-board camera coordinate system;

wherein the at least one processor is further enabled to;

obtain a connecting-line vector of the pole coordinates of the on-board camera in the two preprocessed frames of images;

determine that the condition of going straight is satisfied and take a unit vector corresponding to the connecting-line vector as the X-axis direction of the vehicle coordinate system, in a case that the connecting-line vector coincides with a center axis direction of the vehicle body;

wherein the at least one processor is further enabled to:

obtain a connecting-line vector of the pole coordinates of the on-board camera in the two preprocessed frames of images;

determine that the condition of turning is satisfied in a case that the connecting-line vector does not coincide with the center axis direction of the vehicle body;

take a rotation axis direction which is obtained by conversion of the rotation matrix, as the Z-axis direction of the vehicle coordinate system.

5. The apparatus according to claim 4, wherein the at least one processor is further enabled to:

extract feature points from the two preprocessed frames of images, respectively;

perform pairwise matching and detection on the feature points to obtain N sets of matched feature points, wherein N is a natural number greater than 5.

6. The apparatus according to claim 4, wherein the at least one processor is further enabled to:

solve an essential matrix through the matched feature points according to a principle of epipolar geometry;

obtain a rotation matrix and a translation vector by decomposing the essential matrix;

determine the moving posture of the on-board camera according to the rotation matrix and the translation vector, wherein the moving posture includes: a rotation posture, a translation posture.

7. The apparatus according to claim 4, wherein the at least one processor is further enabled to:

determine, according to the moving posture, whether a vehicle satisfies a condition of going straight or a condition of turning;

determine an X-axis direction of the vehicle coordinate system through pole coordinates of the on-board camera in a case that the condition of going straight is satisfied;

determine a Z-axis direction of the vehicle coordinate system through a rotation matrix in a case that the condition of turning is satisfied;

determine a Y-axis direction of the vehicle coordinate system according to the X-axis direction and the Z-axis direction of the vehicle coordinate system through a vector cross product operation;

determine the external parameter of the on-board camera relative to the vehicle body according to the X-axis direction, the Z-axis direction and the Y-axis direction of the vehicle coordinate system and according to the on-board camera coordinate system.

8. The apparatus according to claim 5, wherein the at least one processor is further enabled to:

determine, according to the moving posture, whether a vehicle satisfies a condition of going straight or a condition of turning;

determine an X-axis direction of the vehicle coordinate system through pole coordinates of the on-board camera in a case that the condition of going straight is satisfied;

determine a Z-axis direction of the vehicle coordinate system through a rotation matrix in a case that the condition of turning is satisfied;

determine a Y-axis direction of the vehicle coordinate system according to the X-axis direction and the Z-axis direction of the vehicle coordinate system through a vector cross product operation;

determine the external parameter of the on-board camera relative to the vehicle body according to the X-axis direction, the Z-axis direction and the Y-axis direction of the vehicle coordinate system and according to the on-board camera coordinate system.

9. The apparatus according to claim 6, wherein the at least one processor is further enabled to:

determine, according to the moving posture, whether a vehicle satisfies a condition of going straight or a condition of turning;

determine an X-axis direction of the vehicle coordinate system through pole coordinates of the on-board camera in a case that the condition of going straight is satisfied;

determine a Z-axis direction of the vehicle coordinate system through a rotation matrix in a case that the condition of turning is satisfied;

determine a Y-axis direction of the vehicle coordinate system according to the X-axis direction and the Z-axis direction of the vehicle coordinate system through a vector cross product operation;

determine the external parameter of the on-board camera relative to the vehicle body according to the X-axis direction, the Z-axis direction and the Y-axis direction of the vehicle coordinate system and according to the on-board camera coordinate system.

10. The apparatus according to claim 7, wherein the at least one processor is further enabled to:

obtain a connecting-line vector of the pole coordinates of the on-board camera in the two preprocessed frames of images;

determine that the condition of going straight is satisfied and take a unit vector corresponding to the connecting-line vector as the X-axis direction of the vehicle coordinate system, in a case that the connecting-line vector coincides with a center axis direction of the vehicle body.

11. The apparatus according to claim 8, wherein the at least one processor is further enabled to:

obtain a connecting-line vector of the pole coordinates of the on-board camera in the two preprocessed frames of images;

determine that the condition of going straight is satisfied and take a unit vector corresponding to the connecting-line vector as the X-axis direction of the vehicle coordinate system, in a case that the connecting-line vector coincides with a center axis direction of the vehicle body.

12. A non-transitory computer readable storage medium storing computer instructions, wherein the computer instructions are used to enable a computer to execute the method described in claim 1.

* * * * *